(12) United States Patent
Jones et al.

(10) Patent No.: US 7,011,802 B2
(45) Date of Patent: Mar. 14, 2006

(54) SYNTHESIS OF MOLECULAR SIEVES BY HYDROTHERMAL TREATMENT WITH ACID

(75) Inventors: Christopher W. Jones, Mableton, GA (US); Mark E. Davis, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 254 days.

(21) Appl. No.: 10/032,270

(22) Filed: Dec. 20, 2001

(65) Prior Publication Data

US 2002/0164283 A1 Nov. 7, 2002

Related U.S. Application Data

(60) Provisional application No. 60/257,503, filed on Dec. 22, 2000.

(51) Int. Cl.
*C01B 33/12* (2006.01)

(52) U.S. Cl. ..................................................... 423/335

(58) Field of Classification Search ............... 423/713, 423/714, 715, DIG. 22, DIG. 27, 335
See application file for complete search history.

(56) References Cited

U.S. PATENT DOCUMENTS

| 4,963,337 | A | * | 10/1990 | Zones | 423/277 |
|---|---|---|---|---|---|
| 5,200,168 | A | * | 4/1993 | Apelian et al. | 423/714 |
| 5,242,676 | A | * | 9/1993 | Apelian et al. | 423/714 |
| 5,508,019 | A | * | 4/1996 | Saxton et al. | 423/714 |
| 5,695,736 | A | * | 12/1997 | Saxton et al. | 423/700 |
| 5,976,356 | A | * | 11/1999 | Drake et al. | 208/135 |
| 5,980,859 | A | * | 11/1999 | Gajda et al. | 423/713 |
| 6,117,411 | A | | 9/2000 | Takewaki et al. | |
| 6,165,439 | A | * | 12/2000 | Benazzi et al. | 423/713 |
| 6,331,500 | B1 | | 12/2001 | Tsuji et al. | |
| 6,468,501 | B1 | * | 10/2002 | Chen et al. | 423/713 |

* cited by examiner

*Primary Examiner*—David Sample
(74) *Attorney, Agent, or Firm*—Richard J. Sheridan

(57) ABSTRACT

Molecular sieves containing structure directing agents are treated by heating the SDA-containing molecular sieve at a temperature and for a time sufficient to remove the SDA from the molecular sieve, followed by heating the molecular sieve in an aqueous, acidic medium.

1 Claim, No Drawings

SYNTHESIS OF MOLECULAR SIEVES BY HYDROTHERMAL TREATMENT WITH ACID

This application claims the benefit of U.S. Provisional Application No. 60/257,503, filed Dec. 22, 2000.

BACKGROUND OF THE INVENTION

Hydrophobic, pure-silica zeolites are useful materials primarily because of their organophylic character and thermal and hydrothermal stability. Microporous, pure-silica molecular sieves can be synthesized hydrothermally using organic molecules—structure-directing agents (SDAs)—to kinetically steer their syntheses to the desired products. However, in many cases, the presence (or absence) of tetrahedral, non-silicon atoms in the synthesis such as boron, aluminum, or zinc causes the formation of different crystalline phases or prevents the formation of a crystalline phase entirely. For example, the use of the N,N,N-trimethyl-2-adamantanammonium cation as an SDA gives SSZ-24 (AFI) when boron is included in the synthesis gel, and SSZ-13, SSZ-23 or SSZ-25 when varying amounts of aluminum are included in the synthesis. In the absence of any tetrahedral, non-silicon atom in the synthesis, no crystalline products are formed. Situations like this invariably arise in zeolite synthesis and as a result, many framework topologies can only be synthesized in a narrow range of framework compositions. For example, molecular sieves of the CON topology have only been directly synthesized to date as borosilicates (SSZ-33, CIT-1) or as an aluminosilicate (SSZ-26).

To access other framework compositions, various strategies have been employed. Dealumination of zeolites is commonly carried out to synthesize high-silica or pure-silica zeolites. Many dealumination procedures have been developed over the years including steaming, treatment with mineral acids or chelating agents, reaction with silicon tetrachloride and treatment with silicon hexafluoride.

Another route to both all-silica and heteroatom-containing framework compositions is through the use of borosilicates as precursor species. Removal of boron from the framework of molecular sieves requires significantly milder conditions than does the removal of aluminum. Vacancies with tetrahedral coordination can then be repopulated in a subsequent step with a variety of species including silicon, titanium, and aluminum, among others.

Recently, the zincosilicate CIT-6 (*BEA topology) was synthesized and extensively characterized. This material is unique because it can be used as a precursor to a variety of molecular sieves of the *BEA structure. The organic SDA can be removed from the micropores by solvent extraction techniques. Furthermore, zinc, like boron, can be easily removed from the molecular sieve framework under relatively mild conditions. In particular, aqueous acetic acid treatments were found to be suitable for removal of zinc from the framework of CIT-6 while simultaneously removing the organic SDA from the micropores. Under the proper conditions, zinc can be completely removed from the material and the vacancies (defects) left behind can be healed with silicon that is presumably dissolved from other parts of the crystal. Similarly, in the development of organic-functionalized molecular sieves (OFMSs), we found that extraction of the organic SDA from the micropores of the molecular sieve using aqueous acetic acid resulted in materials that were essentially free of structural defects[14]. In contrast, extraction with other solvents left a material that contained a significant number of internal defects as determined by $^{29}Si$ solid state NMR spectroscopy.

The present invention relates to the use of acid treatment to a variety of calcined molecular sieves with different framework compositions and structures and the generality of this methodology for preparing a broad spectrum of molecular sieve materials. Calcined borosilicate and pure-silica molecular sieves of different topologies are treated with acid under a variety of conditions and are subsequently characterized in detail. Specific attention is paid to the role of acetic acid in this system.

SUMMARY OF THE INVENTION

In accordance with the present invention there is provided a method of treating a molecular sieve containing a structure directing agent, the method comprising the steps of:
  A. heating the structure directing agent-containing molecular sieve to a temperature and for a time sufficient to remove the structure directing agent from the molecular sieve; and
  B. heating the molecular sieve from step A in an aqueous, acidic medium.

The invention also includes the wherein the heating in step A is calcination. The aqueous, acidic medium may be an aqueous solution of an organic acid or a mineral acid. The organic acid may be acetic acid, propionic acid or oxalic acid. The mineral acid may be hydrochloric acid, nitric acid, sulfuric acid or phosphoric acid.

The aqueous, acid medium has a pH below the isoelectric point of silica, preferably a pH of greater than 0 to about 2.5.

In accordance with the present invention, the aqueous, acid medium in step B is heated at a temperature of about 135° C. or about 160° C. to about 185° C.

In accordance with this invention, the molecular sieve is preferably a zeolite. The zeolite may have the CON, MWW, MFI or *BEA crystal topology. The zeolite preferably contains silicon and may contain silicon and aluminum.

Further provided in accordance with the present invention is a method of increasing the hydrophobicity of a molecular sieve containing a structure directing agent, the method comprising the steps of:
  A. heating the structure directing agent-containing molecular sieve to a temperature and for a time sufficient to remove the structure directing agent from the molecular sieve; and
  B. heating the molecular sieve from step A in an aqueous, acidic medium wherein the molecular sieve from step B is more hydrophobic than the molecular sieve used in step A.

The present invention also provides a molecular sieve produced by the process comprising the steps of:
  A. heating a structure directing agent-containing molecular sieve to a temperature and for a time sufficient to remove the structure directing agent from the molecular sieve; and
  B. heating the molecular sieve from step A in an aqueous, acidic medium.

DETAILED DESCRIPTION OF THE INVENTION

Molecular sieve synthesis. Borosilicate CIT-1 (CON topology) was synthesized via the procedure described in Lobo, R. F. and Davis, M. E., *J. Am. Chem. Soc.* 1995, 117, 3764 using N,N,N-trimethyl(+)myrtanylammonium hydroxide as an SDA in a Teflon-lined autoclave at 160° C. Borosilicate SSZ-33 (CON topology) was synthesized as described in U.S. Pat. No. 4,963,337, issued Oct. 16, 1990 to Zones. The borosilicate of the MWW topology, ERB-1, was prepared using the procedure described in Millini, R., Perego, G., Parker, W. O., Bellussi, G. and Carluccio, L. *Microporous Materials* 1995, 4, 221. Aluminum-free, boron-containing ZSM-5 (MFI topology) was synthesized using the procedure reported in Dwyer, J. and Zhao, J. *J. Mater. Chem.* 1992, 2, 235. Silicalite, the all-silica variant of ZSM-5, was synthesized in the absence of alkali metal ions using a mixture of tetrapropylammonium bromide and piperizine as SDAs. Molecular sieves with the *BEA topology were synthesized in a variety of forms. Borosilicate and pure-silica beta molecular sieves were synthesized using tetraethylammonium fluoride as the SDA. These samples are denoted as B-Beta-F and Si-Beta-F, respectively. Pure-silica beta was also synthesized using 4,4'-trimethylenebis(1-methyl-1-benzylpiperidinium) hydroxide as an SDA using the procedure described in Tsuji, K. and Davis, M. E. *Microporous Mater.* 1997, 11, 53. This material is denoted as Si-Beta-OH. A borosilicate beta sample, referred to as B-Beta-OH, was also synthesized in hydroxide media following the procedure described in U.S. Pat. No. 5,187,132, issued Feb. 16, 1993 to Zones et al. All materials were calcined to remove the occluded structure-directing agent. Samples were heated in an oven at approximately 2° C./min in a nitrogen purge up to the maximum temperature of 500–675° C. at which point air was fed to the oven for 4–8 hours.

The molecular sieves treated in accordance with this invention preferably contain silicon. They may also contain silicon and aluminum. Preferred molecular sieves are zeolites.

Acetic acid treatment. For experiments at temperatures above 100° C., calcined molecular sieves were treated in Teflon-lined autoclaves in an oven with rotation at ~60 rpm for 6 days unless noted. In a typical experiment, 0.2 g of molecular sieve was added to a 45 mL autoclave filled with 25 g water and 10 g glacial acetic acid (pH~1.65). After 144 hours of heating, the autoclave was cooled rapidly in a water bath and the solid products were washed extensively with water and acetone and recovered by filtration. Any variations on this scheme are noted specifically below.

Acetic acid is used throughout this specification as an example of a suitable acid. Other organic acids and mineral acids may also be used. Examples of other organic acids include, but are not limited to, propionic acid and oxalic acid. Examples of mineral acids include hydrochloric acid, nitric acid, sulfuric acid and phosphoric acid.

Analysis. X-ray powder diffraction (XRD) patterns were collected on a Scintag XDS 2000 diffractometer using Cu—K radiation. $^{11}$B, $^{27}$Al and $^{29}$Si NMR spectra were recorded on a Bruker AM 300 spectrometer equipped with a cross-polarization (CP) magic-angle spinning (MAS) accessory. Samples were packed in zirconia rotors (7 mm—$^{29}$Si; 4 mm—$^{11}$B, $^{27}$Al) and spun in air. The $^{29}$Si (59.63 MHz) NMR spectra were obtained at a spinning speed of 4 kHz, with recycle delays of 10 s for Bloch decay (BD) experiments and 2–5 seconds for CP experiments. Contact times for CP experiments were varied from 2.5–4.5 ms. The $^{27}$Al (78.2 MHz) and $^{11}$B spectra (96.3 MHz) were obtained at a spinning speed of 12 kHz (using fully hydrated samples in the case of Al). Additional $^{29}$Si (99.38 MHz) BD and CP NMR experiments were carried out on a Bruker DSX500. In this case, a spinning speed of 8 kHz was used with 4 mm rotors. The DSX 500 was also used for $^{71}$Ga (152.48 MHz) BD NMR experiments with a spinning speed of 12 KHz. In all cases, experiments were referenced externally (B: aq. Boric acid=18.8 ppm; Al: 1N Al(NO$_3$)$_3$; Si: tetrakismethylsilane; Ga: 1N Ga(NO$_3$)$_3$). All reported $^{29}$Si NMR results are from the 300 MHz instrument unless specifically noted. Field-emission scanning electron microscopy (FE-SEM) was performed using a Hitachi S-900 at the University of Tokyo. Prior to observation, the samples were dried in an oven at 85° C., and coated by Pt for a few seconds using magnetron sputtering (Hitachi, E-1030). The acceleration voltage for the observation was varied between 7 and 10 kV. Nitrogen adsorption isotherms were obtained at 77K using an Omnisorp 100 sorption apparatus operating in static mode using fixed dosing. Prior to the adsorption experiment, samples were treated under vacuum at 175° C. for at least 6 hours. Vapor phase water adsorption isotherms were obtained on a McBain-Bakr balance after pretreatment at 175–200° C. in-situ. Nitrogen and water adsorption capacities are reported at P/Po=0.05 and P/Po=0.2, respectively. Elemental analyses were performed at Galbraith Laboratories, Inc., Knoxville, Tenn.

Structural Characterization. All of the samples used are highly crystalline, as determined by XRD and nitrogen physisorption analysis. In most cases, the acetic acid treatment results in no notable changes in the XRD patterns of the samples. Exceptions are the XRD patterns of ERB-1 which show an additional peak at 2=3.5 in samples extracted under all conditions. This extra intensity is also seen in other all-silica materials with the MWW topology.

In contrast to the XRD results, $^{29}$Si BD NMR results show significant differences between the calcined and acetic acid treated molecular sieves in most cases. As the temperature of the treatment is increased, the amount of $Q^3$ silicon in the sample decreases relative to $Q^4$ silicon. In addition, there is a significant sharpening of the $Q^4$ region, allowing crystallographically distinct T sites to be distinguished. These highly resolved NMR spectra can only result from expulsion of boron from the lattice and healing of the created framework defects with silicon. This loss of boron is confirmed by elemental analysis (Table 1). CIT-1, another borosilicate of the CON topology, behaves similarly. However, in this case, the most highly resolved NMR spectra appear slightly different from those of SSZ-33, likely due to the fact that SSZ- 33 is an intergrowth of two polymorphs while CIT-1 is a single polymorph. High silica samples of SSZ-33 and CIT-1 that are nearly free of defects have not been obtained previously. Reported attempts to produce materials of this nature by steaming were unsuccessful.

The $^{29}$Si BD NMR spectra of CIT-1 treated with acetic acid show at least five readily identifiable $Q^4$ silicon maxima at −109.35, −111.15, −111.95, −112.95, and −116.2 ppm. As there are seven crystallographically unique tetrahedral sites in the CON topology[3], further deconvolution of the spectra are required in order to identify all the sites.

The $^{29}$Si BD NMR spectra of ERB-1 (MWW topology) treated with acid after calcination are also markedly affected by the treatment conditions. Like the molecular sieves of the CON topology, treatment at higher temperatures yields materials with NMR spectra exhibiting fewer structural defects ($Q^3$ silicon) and increased T-site resolution in the $Q^4$ region. The spectra of the acetic acid treated materials agree quite well with the published spectrum of ITQ-1, a silicate of the same MWW topology. This result indicates that the present method is effective on materials that contain only 10 MR pore openings (MWW has also 12 MR pores that do not open to the exterior of the crystal) in addition to the CON materials that have 10 and 12 MR pore openings. Furthermore, the fact that the technique works on a material with a relatively high boron content (see Table 1) illustrates its versatility. While the $^{29}$Si BD NMR spectra of the acetic acid treated materials exhibit essentially no $Q^3$ silicon, the materials are not perfectly defect-free, as evidenced by the $^{29}$Si CP NMR spectra shown in FIG. 6.

Expulsion of boron from the lattice and healing of defects with silicon has an effect on the sorptive properties of the molecular sieves. In most cases, a minor loss in the nitrogen adsorption capacity is observed for the samples treated with acid after calcination, as shown in the data listed in Table 1. The silicon that heals the defect sites in the deboronated samples must originate from some portion of the sample, as no extra silicon source is included in the procedure. This slight loss in porosity is likely due to some dissolution of the crystal. FE-SEM results do not show many significant changes in crystal morphology after treatment with acetic acid. For the cases of SSZ-33 and ERB-1, many different crystal habits are evident, with sizes ranging from tens of nanometers to several microns. After treatment at various temperatures with aqueous acid after calcination, the FE-SEM images of the materials are virtually unchanged with regard to particle morphology. However, when the materials are treated in a manner that results in solids where nearly all of their defects are healed as judged by $^{29}$Si BD NMR, notable changes in surface features are apparent in some of the FE-SEM images. For the SSZ-33 samples where the defects have been healed, triangular mesopores are evident in the samples. The number of mesopores appears to be larger on samples treated at the higher temperature. Very small particles are visible on the surface of the crystals that are not present in the other images. These particles may result from dissolution of the small spherical particles in the sample. Another possibility is that they originate from silica that was previously part of the large crystals in the locations of the mesopores.

The presence of the mesopores is important for two reasons. First, it indicates that the silica required to heal the defect sites of the materials may come from the crystal itself, rather than from the smaller particles present via an Ostwald's ripening mechanism. This observation, however, does not rule out the possibility that the smaller crystals are dissolved in order to provide silica that heals defects in the larger ones, although the relative abundances of the small and large particles do not appear to change after treatment with acetic acid. The second important implication of the presence of mesopores concerns the transport of soluble silica species, as the presence of large mesopores would greatly enhance the movement of these species through the pores to the defect sites that they must heal. Note that although mesopores are detected clearly by FE-SEM, significant differences in the nitrogen physisorption isotherms of materials with and without mesopores were not detected due to the low cut-off pressure of the experiments (200 Torr).

Another consequence of the expulsion of boron and healing the defects with silicon is an increase in hydrophobicity. The data in Table 1 illustrate that there is a significant decline in the water adsorption capacities of the materials after calcination followed by treatment with acid, indicating increased hydrophobicity resulting from replacement of boron with silicon in the lattice. The hydrophobicty as measured by the water adsorption uptake correlates nicely with the population of $Q^3$ silicon as determined by $^{29}$Si BD NMR (less $Q^3$ silicon=lower water adsorption). Furthermore, the hydrophobicities of the materials compare well with those of calcined, defect-free materials such as calcined, pure-silica beta synthesized in fluoride media (<0.01 cc/g[14]).

On some materials, the affect of the acid treatment is not as pronounced as illustrated above. For example, when calcined B-MFI is treated with aqueous acetic acid, boron is expelled from the framework but only a fraction of the defects are healed (from the $^{29}$Si BD NMR spectra). Further evidence of the transformation from the borosilicate to the pure-silicate is the increased hydrophobicity of the treated material (Table 1) and the development of additional uptake in the nitrogen physisorption experiment due to nitrogen restructuring. This restructuring is well-known in pure-silica MFI materials but uncommon in heteroatom-containing MFI samples. Of note is the fact that the value of P/Po at which the nitrogen restructuring occurs in the isotherm of the acetic acid treated B-MFI (P/Po=0.05–0.07) differs from that of Si-MFI (P/Po=0.15–0.18). This may be due to differences in crystal morphology or due to difference in the number of internal defects (polar adsorption sites can affect the dipolar interactions in nitrogen) in each sample.

All-silica MFI (Si-MFI) was also treated with acid solution after calcination in an effort to heal anionic defects originating from the charge balancing tetrapropylammonium ion (TPA) in the hydroxide mediated synthesis (see Flanigan, E. M., Bennett, J. M. Grose, R. W., Cohen, J. P., Patton, R. L., Kirchner, R. M. and Smith, J. V. *Nature* 1978, 271, 512). In this case, the $^{29}$Si BD NMR spectrum sharpens to appear more like a defect-free, all-silica material synthesized in fluoride media, although some visible $Q^3$ silicon species at –102.5 ppm clearly remain. The apparent lower efficiency of the treatment on molecular sieves with the MFI topology may be due to the small pore apertures that could limit migration of soluble silica species.

A series of molecular sieves with the *BEA structure were also subjected to calcination followed by the acid treatment. Si-Beta-OH, a nanocrystalline all-silica beta material, did not show significant increases in hydrophobicity (Table 1) after treatment with acetic acid solutions nor did it exhibit significantly less $Q^3$ silicon in the $^{29}$Si BD NMR experiments, although significant changes in nitrogen sorption capacities (Table 1) indicated significant solid dissolution had taken place. Similarly, a nanocrystalline B-Beta sample synthesized in hydroxide media also showed significant levels of $Q^3$ silicon in $^{29}$Si BD NMR experiments. In contrast to the results obtained with the nanocrystalline samples, a boron beta sample with significantly larger crystals, B-Beta-F, could be successfully deboronated with healing of the subsequent defect sites during aqueous acetic acid treatment. However, this material was very sensitive to the temperature of the treatment. As demonstrated by the nitrogen adsorption data in Table 1, extraction at lower temperatures was useful for deboronating the molecular sieve and maintaining good crystallinity whereas higher temperatures led to a significant loss of porosity. Particularly noteworthy is the change in the $^{29}$Si BD NMR spectrum after treatment at 185° C., conditions that lead to significant structural collapse. This loss in crystallinity can also be seen visually upon inspection of the FE-SEM image of the 185° C. treated material.

Numerous experiments were carried out on the SSZ-33 material to ascertain information concerning the role of acetic acid and the mechanism of defect repopulation. Samples were treated under a variety of conditions, with temperature, pH, and the type of solution used as the major variables. Descriptions of the various experiments and the characterization of the resulting samples are tabulated in Table 3. Varying the nature of the acid over a narrow range of pH (1.3–1.75) had little affect on the properties of the resulting material. Use of an organic acid such as acetic acid or different mineral acids that included nitric, sulfuric and hydrochloric all successfully deboronated SSZ-33 and healed the resulting defects to a similar degree (ascertained by the amount of $Q^3$ silicon that is apparent in the $^{29}$Si BD NMR spectra). The mineral acids appear to give materials with slightly sharper $Q^4$ regions in the $^{29}$Si BD NMR spectra. In addition, treatment with mineral acids results in materials with more significant porosity losses than treatment with acetic acid. This may indicate that the mineral acids more readily solubilize silica than does the organic acid. Similar results have been observed while extracting TEAF from all-silica beta using both aqueous hydrochloric acid and acetic acid at the same pH (pH=1.65, 80° C., 12 hrs, 2×). Both treatments completely remove TEAF from the pores of the molecular sieve but the mineral acid treatment results in significant formation of mesopores as determined by nitrogen physisorption measurements.

Variations in the pH appear to have a significant affect on the resulting properties of the solids. pH adjustment was carried out by increasing the amount of acetic acid relative to water to achieve more acidic conditions or by adding aqueous sodium hydroxide to the standard mixture of acetic acid and water to achieve more basic conditions. At 135° C., the amount of $Q^3$ silicon decreases and the sharpness of the $Q^4$ region increases upon moving from a pH of 2.5 to 1.65. However, at a pH of 0.75, the results are generally poorer. This is may be due to the high organic content of the treatment solution (60% acetic acid) that may limit the solubility of dissolved silica species. For treatment at 185° C., the low and moderate pHs gave hydrophobic materials with well-resolved $^{29}$Si BD NMR spectra. However, at a pH of 2.5, structural degradation occurred and both the XRD powder pattern and nitrogen adsorption results were indicative of a partially amorphous material. Apparently, the presence of the added sodium used to adjust the pH of the solution leads to loss of crystallinity at high temperatures. A similar result was obtained upon treatment at a pH of 3.5.

The effect of acidic solutions on microporous metallosilicates, especially aluminosilicates and borosilicates is well documented. Aqueous acids are efficient hydrolyzing agents for the removal of boron and aluminum from the framework, leaving behind silanol nests with Si—O(H) groups that are positioned for the incorporation of other tetrahedral species such as titanium or silicon. Lee, E. F. T. and Rees, L. V. C. *J. Chem. Soc. Faraday Trans.* 1, 1987, 83,1531 discloses the importance of pH during dealumination of zeolite NaY with hydrochloric acid; dealumination did not occur above a pH of 2.3 and complete dealumination occurred below a pH of 0.46. Apelian, M. R., Fung, A. S., Kennedy, G. J. and Degnan, T. F. *J. Phys. Chem.*, 1996, 100, 16577 characterizes in detail zeolite beta samples that were dealuminated by aqueous oxalic acid treatments. They showed using FTIR spectroscopy that samples dealuminated for extended periods of time with the di-acid solution (pH 0.5–1.0) contained a reduced number silanol species attributed to either adjacent silanol condensation or silica migration. However, complete removal of aluminum was not obtained and only a fraction of the silanol defects were healed. In contrast, Giudici, R., Kouwenhoven, H. W. and Prins, R. *Appl. Catal. A*, 2000, 203, 101 reports that significant structural defects remained after dealumination of mordenite with oxalic acid. de Ruiter, R., Pamin, K., Kentgens, A. P. M., Jansen, J. C. and van Bekkum, H. *Stud. Surf. Sci. Catal.*, 1994, 84, 2245 reports that high silica molecular sieves can be synthesized from borosilicates by the deboronation of the materials at room temperature with aqueous hydrochloric acid followed by subsequent insertion of silicon species into the vacancies by treatment with tetramethylorthosilicate or dichloromethylsilane in the liquid phase. This two-step procedure could give partial silylation of the silanol nests to make a high-silica material with relatively few defects (although high levels of repopulation were not achieved). Single step treatments of the calcined borosilicate with $SiCl_4$ were reported to give a substantial loss in crystallinity. In contrast, using the method of the present invention, nearly complete removal of boron with simultaneous healing of silanol nests by silicon is achieved in a single step without the addition of any extra silica sources. Additionally, minor porosity losses are incurred with this method.

Further investigations were carried out to probe the possibility of filling the defect sites with species other than silicon. A fraction of the defects were healed by aluminum or gallium using the following procedure: calcined SSZ-33 was added to an aqueous solution of aluminum nitrate or gallium nitrate in a plastic bottle and heated in an oven for 3 days at 95° C. Subsequently, the solid was recovered by filtration and washed with 0.01 N HCl and water. Using this technique, a portion of the defect sites are filled with the trivalent cation and the remaining sites are left vacant, to give a metallosilicate with internal defects when the amount of added Al or Ga is less than the total number of silanol nests resulting from deboronation. For comparison, calcined SSZ-33 was also treated with an equal amount of aluminum or gallium in aqueous acetic acid and heated at 160° C. for 6 days following the acetic acid treatment procedure outlined here. After population of a portion of the defect sites with the aluminum using the organic-free procedure, the $^{29}$Si BD NMR spectrum clearly shows the presence of both incorporated aluminum and remaining silanols. The $^{29}$Si CPMAS NMR spectrum shows a strong $Q^3$ silicon signal near –102 ppm and that the signal at –104 ppm in the BD spectrum is attributable to $Si(OSi)_3OAl$. The material contacted with acetic acid containing dissolved aluminum cations retains far fewer defect silanols than the material treated with the other insertion procedure. These results indicate that a large portion of the defect silanols can be healed while simultaneously inserting aluminum into a portion of the vacancies. Water adsorption data in Table 3 indicate that insertion in the presence of acetic acid results in a more hydrophobic aluminosilicate. The materials treated with acetic acid suffered from a minor loss in nitrogen capacity. $^{27}$Al BD NMR results indicate that the aluminum in the samples is mostly tetrahedrally coordinated (tetrahedral peak at 57.9 ppm, octahedral peak at 0.4 ppm). The acetic acid treated material was found to contain less extraframework aluminum (~2%) than the material prepared using the other procedure (~10%). Similar results were obtained with the gallium treated materials. $^{71}$Ga BD NMR spectra of both gallium-inserted samples have only a single resonance assigned to tetrahedral gallium at 166 ppm.

The results here indicate that the treatment is most effective at removing boron and healing the defects with silicon when the solution pH is slightly below the isoelectric point of silica (pH~2). Iler divides the behavior of aqueous silicates into 3 regions of pH: pH>7, 2<pH<7, and pH<2 (see Brinker, C. J. and Scherer, G. W. *Sol-Gel Science, Academic Press:* New York, 1990, p. 103 and Iler, R. K., *The Chemistry of Silica, Wiley:* New York, 1979). At pHs in excess of 7, condensation occurs by nucleophilic attack of $OH^-$. In the pH range of 2–7, the same mechanism is thought to occur, with the condensation rate proportional to the concentration of $OH^-$. In contrast, below a pH of 2, the rate is proportional to the concentration of $H^+$ (in the absence of $F^-$). It is under these conditions, where the solubility of silica is low (0<pH<2), that acid treatment is shown here to be very effective at producing nearly defect-free, pure silicates from borosilicates or zincosilicates without an external silicon source. At these conditions, the dissolution of the molecular sieve is slow enough to prevent significant loss of microstructure while at the same time allowing sufficient dissolution of silica to provide soluble species for healing of the defects.

The use the aqueous acetic acid treatment on molecular sieves was first used to extract TEAF from the pores of OFMSs and subsequently applied to CIT-6 for a similar purpose. In both cases, it was found that extraction with TEAF produced completely porous materials that were nearly free of structural defects. In contrast, extraction of OFMSs with aqueous pyridine (pH>7) or a 50/50 mixture of pyridine and 1 N HCl (pH=5.65), as well as extraction of CIT-6 with 1 N NH$_4$NO$_3$ (pH=4.8) gave porous materials that contained internal structural defects. In light of the present invention, it is clear that pH is an overriding factor that controls the presence or absence of structural defects during extraction of SDAs or in the treatment of calcined molecular sieves. Using the treatment in acidic media (0<pH<2), materials that are nearly free of defects can be prepared from Si-Beta or OFMSs made from TEAF, Si-Beta made using tetraethylammonium hydroxide (TEAOH), and CIT-6 (zincosilicate beta) prepared with TEAOH. Similarly, we show here that materials essentially free of defects can be synthesized from calcined SSZ-33, B-Beta, CIT-1, and ERB-1 using similar treatments.

An equally important factor to pH is temperature. Moderate temperatures (135° C.) are required to expel boron from calcined B-Beta-F and heal defects whereas higher temperatures leads to significant structural degradation, possibly due to traces of residual F$^-$. For materials that contain no F$^-$, such as ERB-1, SSZ-33 or CIT-1 (molecular sieves that were synthesized in hydroxide media) higher temperatures give better results (160–185° C.) with limited loss in porosity due to structural degradation. Hence, calcined samples synthesized in the presence of F$^-$ require lower temperatures for effective healing of defects with silicon.

EXAMPLES

The materials shown in the tables below were treated using the acids and conditions shown in the tables.

TABLE 1

Synthetic and physical parameters of samples

| Sample | Topology[a] | Treatment | pH[b] | Temp. (C.) | Time | Si/B[c] | N$_2$ ads (cc/g)[d] | H$_2$O ads. (cc/g)[e] |
|---|---|---|---|---|---|---|---|---|
| CIT-1 | CON | None | — | — | — | 20.9 | 0.225 | 0.034 |
| CIT-1 | CON | aq. acetic acid | 1.65 | 160 | 6 days | >2000 | 0.244 | 0.013 |
| CIT-1 | CON | aq. acetic acid | 1.65 | 185 | 6 days | ND | 0.209 | 0.006 |
| SSZ-33 | CON | None | — | — | — | 19.4 | 0.181 | 0.063 |
| SSZ-33 | CON | aq. HCl | 2.00 | 25 | 5 hours | ND | 0.173 | 0.055 |
| SSZ-33 | CON | aq. acetic acid | 1.65 | 110 | 6 days | 156.5 | 0.186 | 0.020 |
| SSZ-33 | CON | aq. acetic acid | 1.65 | 135 | 6 days | ND | 0.186 | 0.017 |
| SSZ-33 | CON | aq. acetic acid | 1.65 | 160 | 6 days | ND | 0.184 | 0.015 |
| SSZ-33 | CON | aq. acetic acid | 1.65 | 185 | 6 days | 494.0 | 0.175 | 0.006 |
| SSZ-33 | CON | aq. acetic acid | 1.65 | 135 | 14 days | ND | 0.173 | 0.009 |
| ERB-1 | MWW | None | — | — | — | 10.9 | 0.165 | 0.045 |
| ERB-1 | MWW | aq. HCl | 2.00 | 25 | 5 hours | 36.5 | 0.159 | 0.087 |
| ERB-1 | MWW | aq. acetic acid | 1.65 | 135 | 6 days | 75.0 | 0.170 | 0.036 |
| ERB-1 | MWW | aq. acetic acid | 1.65 | 160 | 6 days | ND | 0.164 | 0.013 |
| ERB-1 | MWW | aq. acetic acid | 1.65 | 185 | 6 days | ND | 0.146 | 0.007 |
| ERB-1 | MWW | aq. acetic acid | 1.65 | 185 | 6 days | ND | 0.141 | 0.011 |
| Si-MFI | MFI | None | — | — | — | — | 0.144 | 0.011 |
| Si-MFI | MFI | aq. acetic acid | 1.65 | 185 | 6 days | — | 0.153 | 0.013 |
| B-MFI | MFI | None | — | — | — | 51.4 | 0.138 | 0.019 |
| B-MFI | MFI | aq. acetic acid | 1.65 | 135 | 6 days | >900 | 0.143 | 0.013 |
| B-MFI | MFI | aq. acetic acid | 1.65 | 185 | 6 days | >400 | 0.140 | 0.009 |
| Si-Beta-OH | *BEA | None | — | — | — | — | 0.285 | 0.045 |
| Si-Beta- | *BEA | aq. | 1.65 | 135 | 6 | — | 0.248 | 0.047 |

TABLE 1-continued

Synthetic and physical parameters of samples

| Sample | Topology[a] | Treatment | pH[b] | Temp. (C.) | Time | Si/B[c] | N$_2$ ads (cc/g)[d] | H$_2$O ads. (cc/g)[e] |
|---|---|---|---|---|---|---|---|---|
| OH | | acetic acid | | | days | | | |
| Si-Beta-OH | *BEA | aq. acetic acid | 1.65 | 160 | 6 days | — | 0.226 | 0.030 |
| B-Beta-F | *BEA | None | — | — | — | 29.2 | 0.231 | 0.039 |
| B-Beta-F | *BEA | aq. acetic acid | 1.65 | 135 | 6 days | >350 | 0.239 | 0.039 |
| B-Beta-F | *BEA | aq. acetic acid | 1.65 | 185 | 6 days | >1000 | 0.099[F] | 0.011 |

[a] international zeolite association structure code
[b] initial solution pH
[c] Si/B ratio as determined by elemental analysis
[d] as determined by nitrogen adsorption, 77° C. P/Po = 0.05
[e] water adsorption on a McBain-Bakr balance, 25° C., P/Po = 0.2
[f] some structural collapse
ND = not determined It should be noted that when the material was treated at 25° C., the defects in the material's crystal structure were not annealed (repaired).

TABLE 2

Assignment of $^{29}$Si BD NMR lines of CIT-1 extracted at 185° C.

| 300 Mhz[a] d[c] | 500 MHz[b] d[c] | 300 Mhz[a] I[d] | 500 MHz[b] I[d] | 300 Mhz[a] FWHM[e] | 500 MHz[b] FWHM[e] |
|---|---|---|---|---|---|
| −109.49 | −109.61 | 1.1 | 1.1 | 0.635 | 0.515 |
| −109.93 | −109.98 | 1.1 | 1.0 | 0.948 | 0.870 |
| −111.16 | −111.03 | 1.3 | 1.2 | 0.736 | 0.600 |
| −111.5 | −111.53 | 1.3 | 1.0 | 0.441 | 0.358 |
| −112.2 | −112.15 | 0.9 | 0.7 | 0.489 | 0.302 |
| −113.2 | −113.22 | 0.9 | 1.0 | 0.389 | 0.338 |
| −116.45 | −116.49 | 0.8 | 0.9 | 0.482 | 0.311 |

[a] 10 s pulse delay
[b] 60 s pulse delay
[c] chemical shift, in ppm
[d] intensity, (normalized; crystal structure predicts all should have intensity = 1)
[e] full width half max

TABLE 3

Synthetic and physical parameters of samples used in control experiments

| Sample | Topology[a] | Treatment | PH[b] | Temp. (C.) | Time | Si/B[c] | N$_2$ ads (cc/g)[d] | H$_2$O ads. (cc/g)[e] |
|---|---|---|---|---|---|---|---|---|
| Varying the acid | | | | | | | | |
| SSZ-33 | CON | aq. acetic acid | 1.65 | 135 | 6 days | ND | 0.186 | 0.017 |
| SSZ-33 | CON | aq. HCl | 1.30 | 135 | 6 days | ND | 0.178 | 0.016 |
| SSZ-33 | CON | aq. HNO$_3$ | 1.30 | 135 | 6 days | ND | 0.168 | 0.014 |
| SSZ-33 | CON | aq. H$_2$SO$_4$ | 1.30 | 135 | 7 days | ND | 0.170 | 0.020 |
| Varying the pH and temperature | | | | | | | | |
| SSZ-33 | CON | aq. acetic acid | 0.75 | 135 | 6 days | 196.0 | 0.186 | 0.028 |
| SSZ-33 | CON | aq. acetic acid | 1.65 | 135 | 6 days | ND | 0.186 | 0.017 |
| SSZ-33 | CON | aq. acetic acid | 2.50 | 135 | 6 days | 66.9 | 0.154 | 0.027 |
| SSZ-33 | CON | aq. acetic acid | 0.90 | 185 | 6 days | ND | 0.193 | 0.004 |
| SSZ-33 | CON | aq. acetic acid | 1.65 | 185 | 6 days | 494.0 | 0.175 | 0.006 |
| SSZ-33 | CON | aq. acetic acid | 2.50 | 185 | 6 days | ND | 0.076 | ND |

TABLE 3-continued

Synthetic and physical parameters of samples used in control experiments

| Sample | Topology[a] | Treatment | PH[b] | Temp. (C.) | Time | Si/B[c] | $N_2$ ads $(cc/g)$[d] | $H_2O$ ads. $(cc/g)$[e] |
|---|---|---|---|---|---|---|---|---|
| Additional Iterations | | | | | | | | |
| SSZ-33 | CON | water, Al(NO$_3$)$_3$ | ND | 95 | 3 days | 56.7[fg](199) | 0.186 | 0.065 |
| SSZ-33 | CON | aq. acetic acid, Al(NO$_3$)$_3$ | 1.65 | 160 | 6 days | 56.3[g] | 0.175 | 0.059 |
| SSZ-33 | CON | water, Ga(NO$_3$)$_3$ | ND | 95 | 3 days | 45.1[h] | 0.189 | ND |
| SSZ-33 | CON | aq. acetic acid, Ga(NO$_3$)$_3$ | 1.65 | 160 | 6 days | 78.1[h] | 0.175 | ND |
| SSZ-33 | CON | aq. acetic acid[i] | 1.65 | 135 | 6 days | ND | 0.167 | 0.009 |
| SSZ-33 | CON | aq. acetic acid[j] | 1.65 | 135 | 6 days | ND | amor.[k] | ND |
| ERB-1 | MWW | aq. acetic acid[i] | 1.65 | 185 | 6 days | ND | 0.141 | 0.011 |

[a]international zeolite association structure code
[b]initial solution pH
[c]Si/B ratio as determined by elemental analysis
[d]as determined by nitrogen adsorption P/Po = 0.05
[e]water adsorption on a McBain-Bakr balance, 25° C., P/Po = 0.2
[f]Si/B ratio in parentheses after treatment
[g]Si/Al ratio as determined by elemental analysis
[h]Si/Ga ratio as determined by elemental analysis
[i]solution pre-saturated with soluble SiO$_2$ species
[j]solution pre-saturated with soluble GeO$_2$ species
[k]structural collapse leaving nonporous, amorphous material
ND = not determined

What is claimed is:
1. An all-silica molecular sieve having the CON crystal topology.

* * * * *